Aug. 19, 1941.                F. J. LAPOINTE                2,253,303
                              BROACHING MACHINE
                          Filed Jan. 10, 1938           4 Sheets-Sheet 1

Inventor:
Francis J. Lapointe,

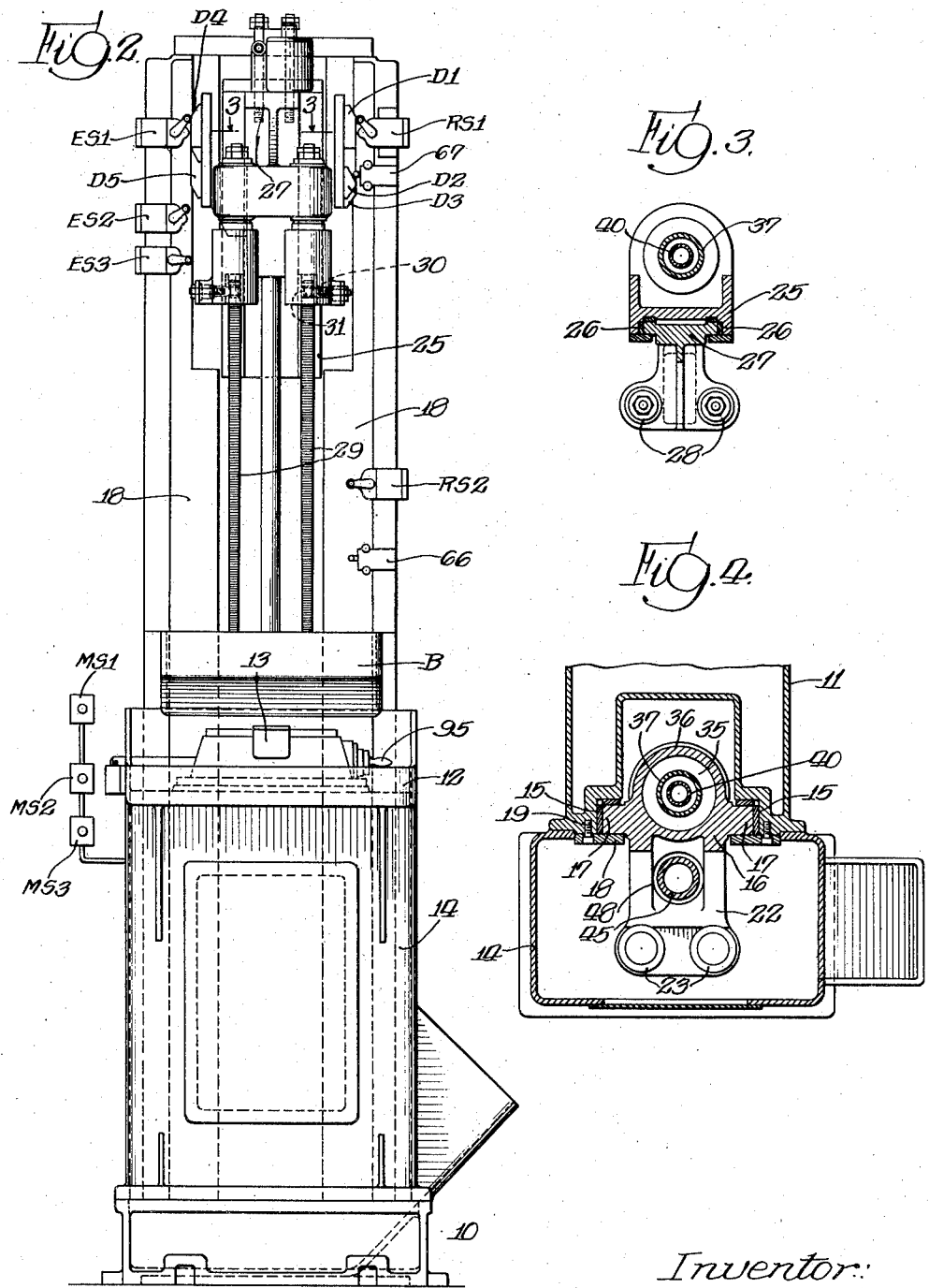

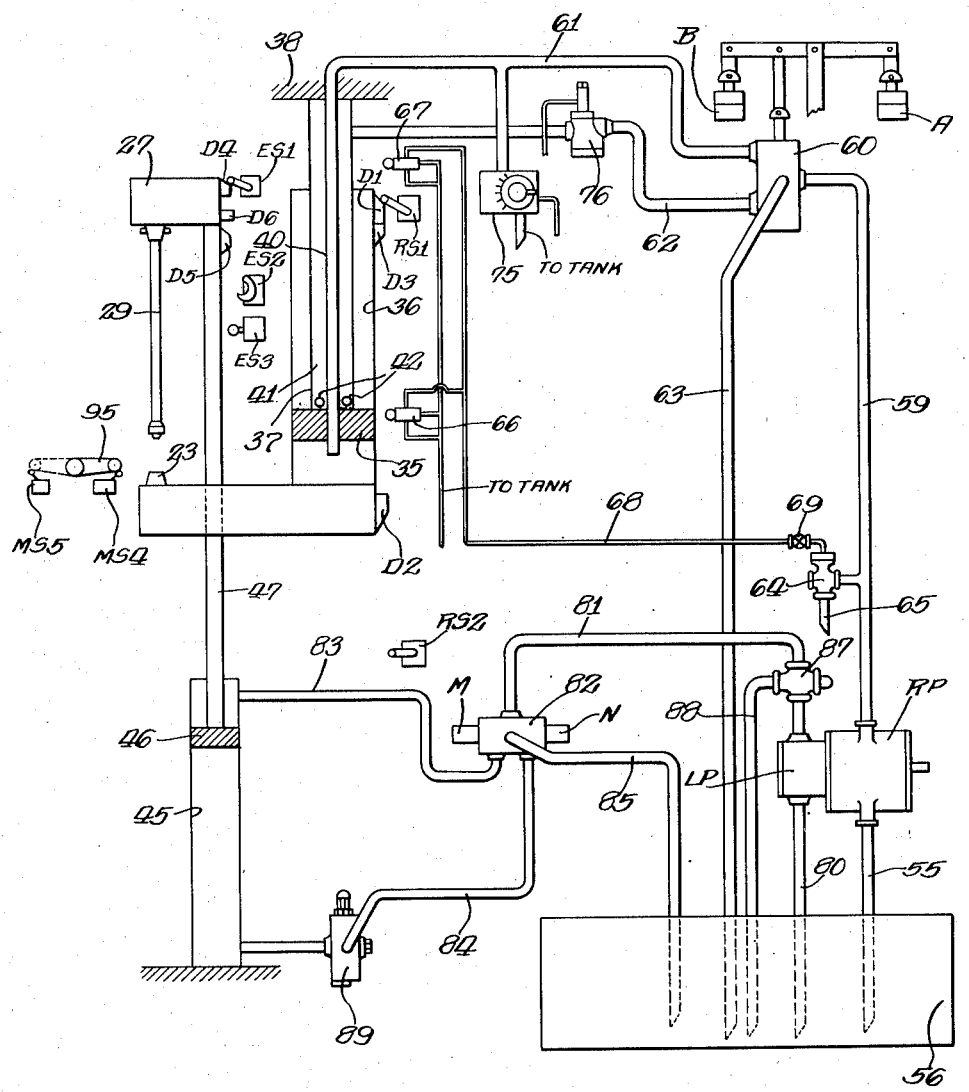

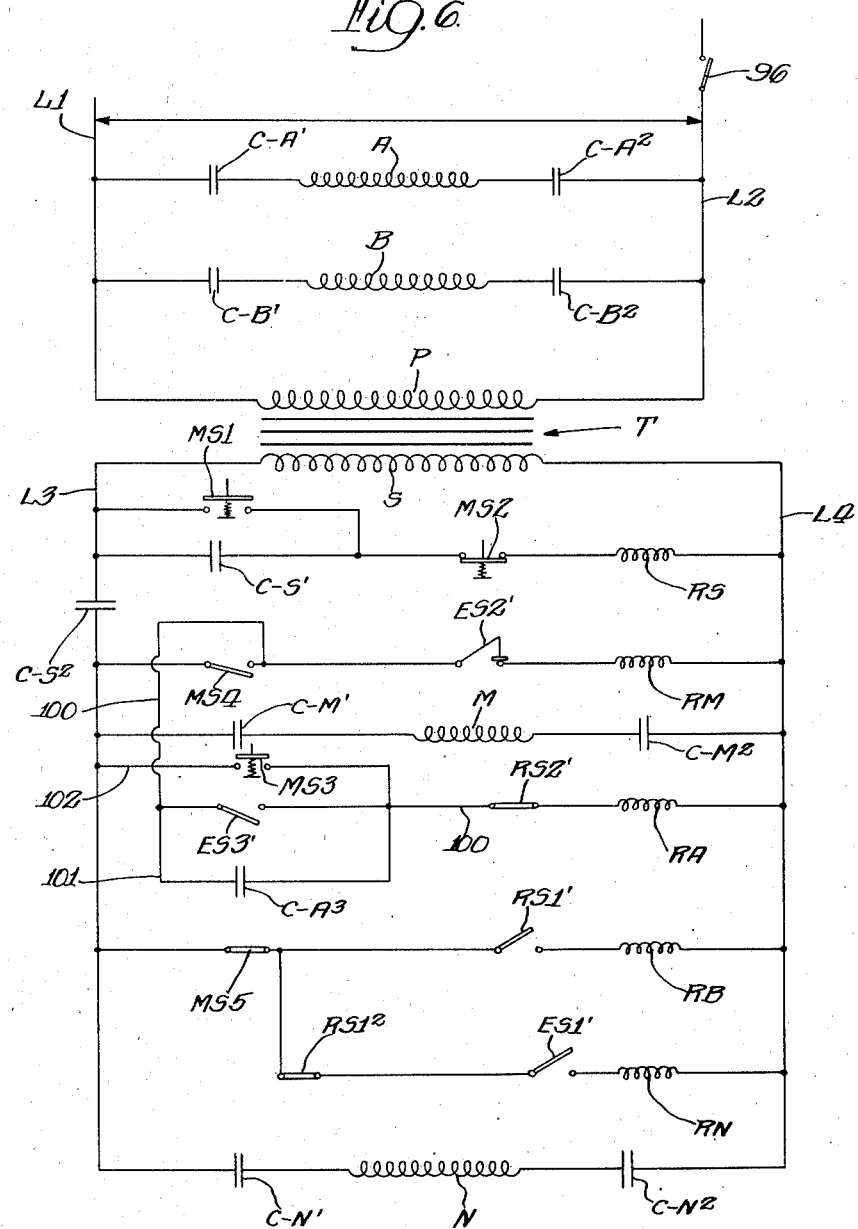

Patented Aug. 19, 1941

2,253,303

UNITED STATES PATENT OFFICE 2,253,303

BROACHING MACHINE

Francis J. Lapointe, Ann Arbor, Mich., assignor, by mesne assignments, to American Broach & Machine Co., Ann Arbor, Mich., a corporation of Michigan Application January 10, 1938, Serial No. 184,176

17 Claims. (Cl. 90—33)

The invention relates generally to broaching machines and more particularly to broaching machines employed for performing internal broaching operations.

A general object of the invention is to perfect a broaching machine and particularly an internal broaching machine of new and improved construction with enhanced performance, output and ease of operation and control.

A more particular object of the invention is to provide a broaching machine having a new and improved automatic broach handling mechanism.

Another object is to provide an internal broaching machine having a main slide or ram for imparting a broaching stroke to a broach and a new and improved internal broach handling mechanism cooperable with the ram to support both ends of the broach throughout the major portion of the broaching stroke.

Yet another object is to provide in a broaching machine, having a main slide or ram for imparting a broaching stroke to a broach, an automatic internal broach handling mechanism including an elevator for handling the broach before and after the broaching stroke, the elevator being slidably mounted directly on the main slide to have both movement therewith and a movement relative thereto enabling the broach to be accurately and rigidly supported at one end by the elevator during the major portion of the broaching stroke.

A further object is to provide a broaching machine having a fixed work support, a main slide for imparting a pull broaching stroke to an internal pull broach having means for engaging the broach disposed on one side of the work support, a new and improved broach handling mechanism including an elevator slidably mounted on said main slide on the side of the work support opposite the broach engaging means of the slide for movement both with and relative to said slide, the elevator functioning exclusively to support the broach before and after the broaching operation, to load the broach through the work into engagement with the main slide and to support one end of the broach during the major portion of the broaching stroke, and means for coordinating the movement of the main slide and the broach handling mechanism.

Still a further object is to provide a broaching machine having a broach handling mechanism and combined hydraulic and electrical power and control means of new and improved construction.

Yet a further object is to provide in a broaching machine having a work supporting fixture, means for imparting a broaching and a return stroke to a broach, automatic broach handling mechanism and control means for arresting said machine at the end of a broaching stroke and at the end of a return stroke, a manually actuable means operable to initiate a broaching stroke and to lock said work fixture prior to such stroke and to initiate a return stroke and to withdraw said fixture prior to such return stroke.

Other objects and advantages will become apparent from the following detailed description taken in connection with the accompanying drawings, in which:

Fig. 2 is a front elevational view of the broaching machine shown in Fig. 1.

Fig. 3 is a sectional view taken approximately along the line 3—3 of Fig. 2 looking in the direction of the arrows.

Fig. 4 is a sectional view taken approximately along the line 4—4 of Fig. 1, looking in the direction of the arrows.

Fig. 5 is a diagrammatic view of the hydraulic circuit of the broaching machine shown in Fig. 1.

Fig. 6 is a diagrammatic view of the electrical control circuit of the machine shown in Fig. 1.

Figure 1:
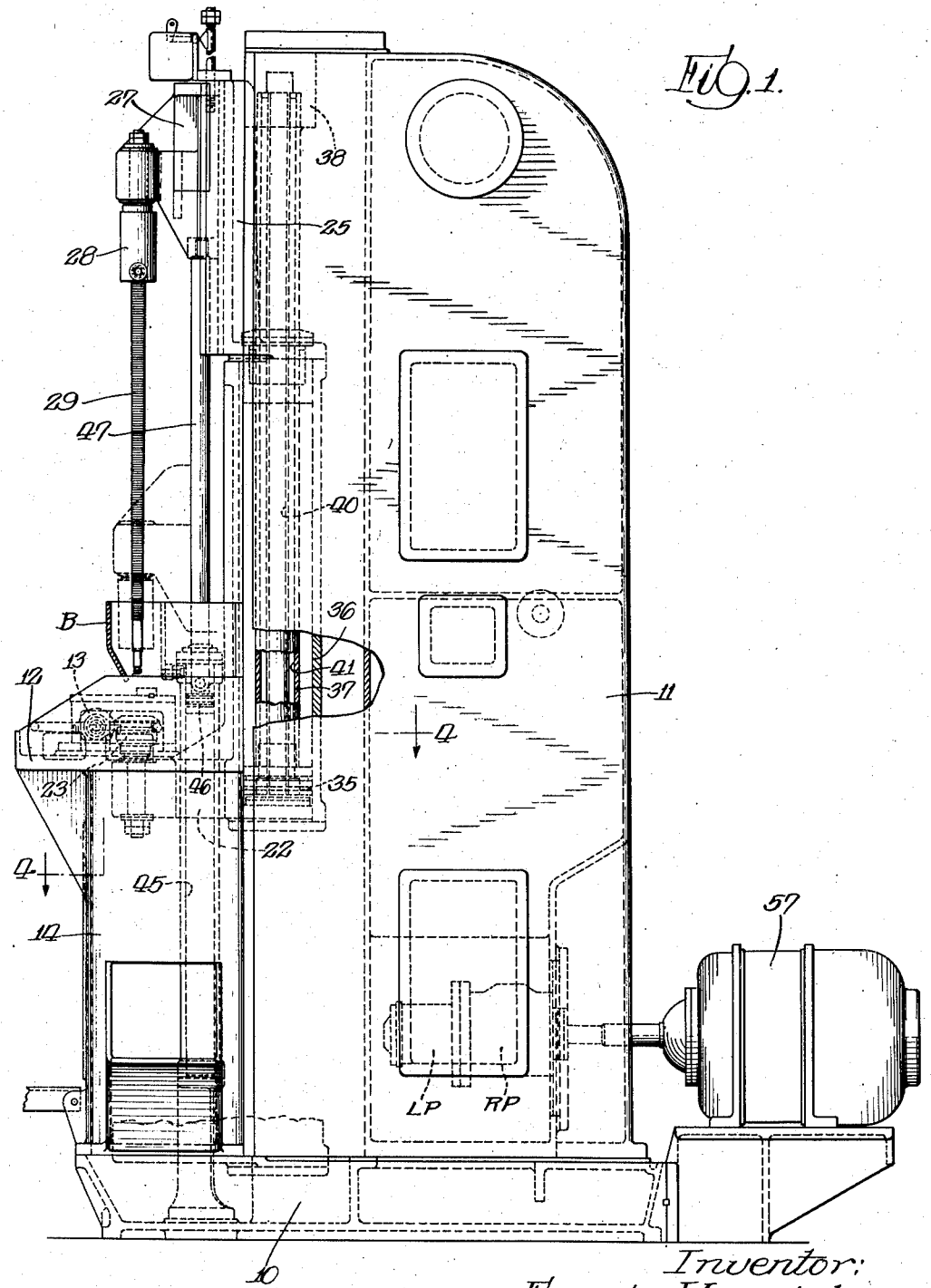
Fig. 1 is a side elevational view partially in section of a preferred form of broaching machine embodying the features of the invention.

While the invention is susceptible of various modifications and alternative constructions, it is shown in the drawings and will be described hereinafter in a preferred embodiment, but it is not intended that the invention is to be limited thereby to the specific construction disclosed, but it is intended to cover all modifications and alternative constructions falling within the spirit and scope of the invention as defined by the appended claims.

Though the invention relates to broaching machines broadly, it is more particularly directed to broaching machines adapted for internal broaching operations. In such internal broaching operations the handling of the broach, that is, the loading of the broach through the work and the positioning of the broach so that the work piece may be removed before a return stroke of the broach takes place, and similar operations, presents a major problem for, depending upon the time spent in such handling of the broach, the machine and the attendant may be efficient and productive or inefficient and non-productive. Not only is the manner of handling the broach of importance, but it is also essential, particularly in internal pull broaching operations, that the broach be guided at both ends through its entire broaching stroke. It is to the provision of a broaching machine having a broach handling mechanism which not only operates efficiently, so as to cause the broaching machine to have a high production rate, but which also rigidly and accurately guides one end of the broach through the major portion of its broaching stroke, that the broaching machine described herein has been perfected. This broaching machine has, in addition, control means which automatically coordinates the operations of the broach handling mechanism with the other operations of the machine so that the desired efficient operation of the machine is obtained.

A vertical broaching machine of the internal pull broaching type has been chosen to illustrate the preferred embodiment of the invention, but it is to be understood, of course, that the invention is also applicable to other machines such as horizontal machines, machines in which the broaching stroke is up instead of down as here shown, and push broaching machines. The machine is shown here as having a fixed work supporting table disposed at the front of the machine intermediate the top and bottom thereof. Vertically reciprocable relative to the table is a power driven broach actuating slide having means disposed below the table for engaging one end of a broach to actuate the same through a broaching or return stroke, the slide being of sufficient length at all times to extend to the opposite side or, in the present instance, above the work supporting table. Also located at the front of the machine is the broach handling mechanism including an elevator disposed on the side of the table opposite the broach engaging means of the power slide, that is, above. This elevator is adapted to support the broach before a broaching stroke for loading the broach through the work into engagement with the broach engaging means of the main slide and to support the broach after a return stroke for disengaging the broach from the main slide and elevating it above the table at the end of a return stroke to permit the loading of a new work piece. In the present instance, this broach handling mechanism is of unique construction in that the elevator is slidably mounted directly upon the broach actuating slide so as to be both movable therewith and movable relative thereto. This unique mounting enables the elevator to guide one end of the broach rigidly and accurately through the major portion of the broaching operation. The main slide and the broach handling mechanism herein are hydraulically actuated under a semiautomatic electrical control system.

In a position at rest, the broach actuating slide is retracted to an uppermost initial or starting position, such as that shown in Fig. 1, and the elevator of the broach handling mechanism also is retracted to an uppermost initial or starting position, in which position the broach or broaches carried by the elevator are disengaged from the broach actuating slide and are elevated above the work supporting table a distance such that a work piece may be loaded on the table. After a work piece has been loaded on the work supporting table, a cycle of operation is initiated manually by actuation of a suitable part of the electrical control system and, as an incident to such actuation, the elevator first moves relative to the main broach actuating slide toward the work supporting table to load the broach through the work and the table into the broach engaging means of the broach actuating slide. Approximately simultaneously with the engagement of the broach with the broach engaging means of the main slide or preferably just slightly subsequent thereto, so as to insure engagement of the broach, the elevator trips a switch of the electrical control system to initiate movement of the broach actuating slide on a broaching stroke. During such broaching stroke, the elevator moves with the broach actuating slide, thus accurately and rigidly guiding the upper end of the broach through the major portion of its broaching stroke. Near the end of the broaching stroke, the elevator is arrested by engagement with a fixed abutment while the slide continues, thereby disengaging the broach from the elevator, to complete the broaching stroke and to draw the broach through the work to an extent such that the work is free to be removed. The broaching stroke of the slide is arrested by the tripping of a suitable switch of the control system by the slide as it reaches the end of the broaching stroke.

The elements are now all at rest and to complete the cycle the attendant first removes the work piece and then again actuates manually a switch of the control system, initiating the second or return half of the cycle. In this half of the cycle the movements of the main slide and the elevator are reversed as to sequence with the main slide having an initial return or upward movement. In such upward movement the broach is passed through the work support and into engagement with the elevator after which the elevator and the slide are returned simultaneously until the slide reaches its initial position. As an incident to reaching that position it actuates a switch of the control system which in turn causes the elevator to be moved through the remaining distance relative to the main slide to its initial position in which the broach has been entirely withdrawn through the work supporting table to a position well above the table enabling a new work piece to be loaded.

Referring now more particularly to the drawings, 10 represents the base of the broaching machine upon which is mounted a vertically disposed frame 11. Fixed on the front of the frame 11 is a work supporting table 12 disposed intermediate the bottom and top of the frame, in the present instance approximately at a height providing for the convenient loading or unloading of work pieces onto the table by an attendant of the machine. The table 12 carries a work supporting fixture generally designated 13, which may be actuated to lock the work piece in broaching position or may be actuated to an unlocked and withdrawn position permitting the work piece to be removed. Disposed below the work supporting table 12 is a conventional chip pan 14 which may be considered as forming a part of the frame 11.

The frame 11 is in large part hollow to accommodate the elements of the hydraulic power system and the elements of the electrical control system, and has formed in its front face (see Figs. 2 and 4) vertical ways 15 which extend from the base substantially to the top of the frame. Reciprocable vertically of the frame past the table 12 is the broach actuating slide, here designated 16, which is formed with oppositely disposed flanges 17 slidable in the ways 15 and retained and guided therein by means of vertical plates 18 removably secured to the frame 11 by means of bolts 19. At its lower end, the slide has a lateral extension 22 projecting forwardly beneath the table 12. In the present instance, this extension carries a pair of broach engaging means 23 of some conventional construction enabling the same to receive and secure the end of a broach forced into the end thereof and releasing the broach when the engaging means 23 strike a suitable part of the table 12, as an incident to the return of the slide to its uppermost or initial position. While two such broach engaging means are disclosed herein, it is to be understood that any number may be provided, depending upon the number of broaches to be employed.

In the present instance, the slide 16 is of unusual length to provide a unique mounting for the elevator or carrier of the broach handling mechanism. Accordingly the slide 16 is formed at its upper end with an extension 25 (Fig. 3) which is somewhat reduced in width compared to the main portion of the slide and which has formed therein guideways 26 extending longitudinally of the slide. Reciprocable in the ways 26 of the slide 16 is the elevator or carrier, herein designated 27, of the broach handling mechanism which thus is adapted to have movement relative to the slide as well as movement with the slide. The elevator 27 carries two downwardly opening sockets 28 which are constructed yieldably to retain broaches 29 forced thereinto. As can be seen in Fig. 2, the sockets comprise simply a spring pressed plunger 30 which is yieldably urged into engaging relation with an annular groove 31 formed in the upper end of the broach 29 and thus permit the insertion or withdrawal of a broach by the application of force to the broach.

The elevator 27, of course, as previously stated generally, has a predetermined movement both relative to and jointly with the slide 16 such that it first moves relative to the slide to load the broaches 29 through the work and the table 12 into the broach engaging means 23, then moves jointly with the slide during the major portion of the broaching stroke and near the end of the broaching stroke is arrested, while the slide 16 continues on its broaching stroke and in such movement withdraws the broaches 29 from the sockets 28 to complete the broaching stroke and to draw the broaches through the work pieces so as to permit removal thereof. Conversely, upon the return half of the cycle of the machine, the slide 16 has an initial movement relative to the elevator 27 in which the broaches 29 are passed upwardly through the table 12 and are forced into sockets 28 after which the elevator and the slide move jointly until the slide reaches its initial position, after which the elevator has a movement relative to the slide in which the broaches 29 being released from the engaging means 23 are drawn upwardly by the elevator to a sufficient height above the table to permit the loading of new work pieces on the table. It is believed apparent from the foregoing, and will become even more apparent hereinafter, that the unique mounting of the elevator enables the broaches to be handled efficiently and at the same time permits the upper ends of the broaches to be rigidly and accurately guided through the major portion of their broaching stroke. This, moreover, is readily accomplished and does not require complicated means for assuring the joint and coordinated movement of the elevator and the slide, nor the exercise of extreme care and of compensation for wear to assure proper alinement of the elevator and particularly of the broaches when supported and guided by the elevator.

The slide 16 and the elevator 27 each has a power means for actuating the same and, while the power means may take a variety of forms, a preferred form is a hydraulic motor as disclosed herein. In the case of the main slide 16, the hydraulic motor is composed of a piston 35 and a cylinder 36 which herein constitutes the movable element of the motor and, for the sake of strength and rigidity, is formed as an integral part of the slide 16. The piston 35 being the stationary element has a piston rod 37 which extends through the upper end of the cylinder 36 and is anchored in a block 38 at the top of the frame 11. To supply fluid to the head end of the cylinder, the piston rod 37 in conventional manner is made hollow and has extending therethrough a duct or tube 40 which projects downwardly through the piston to communicate with the head end of the cylinder 36. The annular space between the rod 37 and the duct 40 constitutes a passage 41 for the supply and return of fluid to and from the rod end of the cylinder and, accordingly, the piston rod 37 adjacent the piston 35 is formed with apertures 42 (see Fig. 5) providing communication between the annular passage 41 and the rod end of the cylinder.

In the case of the elevator 27, the hydraulic motor also comprises a vertically disposed cylinder 45 and a piston 46 reciprocable in the cylinder and having a rod 47 projecting through the upper end of the cylinder 45 and into engagement with the elevator 27. The cylinder 45 is disposed in the chip pan 14 in front of the guideways 15 and extending upwardly through the table 12 and to accommodate the cylinder the extension 22 is provided with an aperture 48.

For driving the motors of the slide 16 and of the broach handling mechanism, the invention contemplates provision of a hydraulic power system. For a more ready understanding, this system is disclosed diagrammatically in Fig. 5, and it will be seen from a reference to Fig. 5 that the system is composed of a high pressure circuit for actuating the broaching slide or ram 16 and of a comparatively low pressure circuit for actuating the broach handling mechanism. Referring more particularly to Fig. 5, hydraulic fluid under pressure is supplied to the high pressure circuit by means of a large output, high pressure ram pump RP whose inlet is connected by means of a conduit 55 to a tank or reservoir 56 for storing suitable hydraulic fluid, preferably oil. The ram pump RP is driven by suitable means, such as an electric motor 57 (see Fig. 1), and discharges fluid under pressure to a supply line 59 which discharges to a four-way valve 60. The valve 60 is connected by a conduit 61 to the conduit 40 opening through the piston 35 so as to communicate with the head end of the cylinder 36. The rod end of the cylinder 36 is connected with the valve 60 through the medium of the annular passage 41, previously described, and a conduit 62 which communicates at one end with the passage 41 and at the other end with the valve 60. A return conduit 63 leads from the valve 60 to the reservoir 56.

To limit the pressure thus built up in the circuit, particularly the supply side thereof, there is connected to the supply line 59 a relief valve 64 which is adjustable to maintain a predetermined maximum pressure limit in the supply line 59 which, if exceeded, will cause the valve 64 to open and discharge to the tank 56 through a conduit 65. This valve, moreover, is adapted to be controlled by safety valves 66 and 67 connected thereto by means of a common conduit 68. The valves 66 and 67 are not new per se, but are of the type which function upon being actuated to vent the valve 64 and thus cause the same to permit discharge of fluid from the supply line 59 at no pressure. Interposed in the conduit 68 is a valve 69 which may be manually actuated to close or open the conduit 68 and thus remove or place the valve 64 from or under the control of the valves 66 and 67. To control the rate of movement of the slide or ram 16 during the broaching stroke, there is connected to the conduit 61 a feed control device 75 which is adjustable to by-pass varying quantities of fluid and thus vary the rate at which the ram 16 is driven by the pump RP. Interposed in the conduit 62 is a by-pass and check valve 76 which permits free flow of fluid from the valve 60 to the rod end of the cylinder to effect a return stroke of the ram, but restricts the flow of fluid from the rod end of the cylinder to the valve 60 during the broaching stroke of the ram so as to prevent overrunning of the ram.

Valve 60 has three positions, namely, a neutral or normal position, which is that in which it is shown in Fig. 5, and a position on either side of neutral in which fluid is supplied respectively to the conduits 61 and 62. In the neutral position of the valve 60 no fluid is supplied to or discharged from either of the conduits 61 and 62, but is by-passed directly to the return conduit 63. The control of the broaching machine being electrical, the valve 60 is actuated by the energization of solenoids A and B. Energization of solenoid A shifts the valve 60 to a position causing pressure fluid to be supplied through the conduit 61 to the head end of the cylinder 36 to effect a broaching stroke, and energization of the solenoid B shifts the valve 60 to a position causing pressure fluid to be supplied through the conduit 62 to the rod end of the cylinder effecting a return stroke of the ram. Conduits 61 and 62, of course, also function in well known manner to conduct exhaust fluid from the cylinder 26 to valve 60 from which it is returned to the reservoir 56 through conduit 63. The valve with its solenoids A and B is biased to return to neutral position when both solenoids A and B are deenergized.

Pressure fluid for the low pressure circuit of the broach handling mechanism is supplied by a small output, low pressure pump LP supported from the casing of the pump RP and driven from a common shaft by the electric motor 57. This pump draws fluid from the reservoir 56 through a conduit 80 and discharges to a fluid supply line 81 which leads to a four-way valve 82. The four-way valve 82 in turn is connected by a conduit 83 to the rod end of the cylinder 45 and is connected by a conduit 84 to the head end of the cylinder 45, while a return conduit 85 leads to the reservoir 56. Connected in the supply line 81 is a relief valve 87 operable to discharge fluid to the reservoir 56 through a conduit 88 should the pressure in the supply line 81 exceed the limit for which the relief valve 87 is set. Interposed in the conduit 84 is a by-pass and check valve 89 similar to the valve 76 which permits free flow through the conduit 84 in a direction from the valve 82 to the cylinder 45 for raising the elevator 27 but which restricts and retards the flow in the opposite direction through the conduit 84 so as to prevent the elevator from overrunning the pump LP.

Like the valve 60, valve 82 has three positions, namely, a neutral or normal position which is that in which it is shown in Fig. 5, and a position on either side of neutral in which fluid is supplied respectively to the conduits 83 and 84. In the neutral position of the valve 82, the supply line 81 as well as the conduits 83 and 84 are connected to the reservoir through the return conduit 85 permitting a free interchange of fluid between the head and rod end of the cylinder 45 at no pressure. The control of the broaching machine being electrical, the valve 82 is shifted from its neutral position by the energization of solenoids M and N provided for that purpose. Energization of solenoid M shifts the valve 82 to a position causing pressure fluid to be supplied through the conduit 83 to the rod end of the cylinder 45 to effect a movement of the elevator 27 loading the broach through the work. Energization of the solenoid N shifts the valve 82 in the opposite direction causing the pressure fluid to be supplied through the conduit 84 to the head end of the cylinder 45 and raising the elevator 27. Conduits 83 and 84, of course, also function in well known manner as return conduits permitting exhaust fluid from the cylinder 45 to be returned to the valve 82 and hence through conduit 85 to the reservoir 56.

It is essential for the proper operation of the broaching machine here disclosed that the movements of the main slide or ram and of the broach handling mechanism be precisely coordinated and timed. Accordingly a semiautomatic control system is provided herein which, as previously stated, is electrical in character. Like the hydraulic system, the electrical control system is composed of a high voltage circuit for controlling the solenoids A and B of the high pressure ram circuit and a circuit of low voltage for controlling the solenoids M and N of the low pressure broach handling mechanism circuit. The electrical control system is disclosed diagrammatically in Fig. 6, to which in particular reference will now be made.

In addition to the solenoids mentioned, the circuits comprising the electrical control system include a plurality of relays RA, RB, RM, RN and RS, a plurality of switches actuated by the ram or the elevator, and a plurality of manual push button switches. Of the relays, RA and RB control respectively switches C—A' and C—A², and C—B' and C—B², which are open when the relays are deenergized and closed upon energization of the relays. As their designation suggests, these switches and relays are associated with the solenoids A and B. In addition the relay RA controls a third switch C—A³ which also is open when the relay is deenergized and, as will shortly become apparent, is connected in the low voltage circuit. The relay RM controls a plurality of switches C—M' and C—M² both of which are open when the relay RM is deenergized and are closed upon energization of the relay RM. Similarly, the relay RN controls switches C—N' and C—N² both of which are open when the relay is deenergized and closed upon energization of the relay. The relays RM and RN and the switches controlled thereby are, as their designation indicates, associated respectively with the solenoids M and N. The relay RS is the main starting relay and controls a switch C—S' and a switch C—S², both of which are open when the relay is deenergized and closed upon energization of the relay.

The ram and broach handling mechanism actuated switch devices comprise switch devices RS1 and RS2 actuated by the ram and switch devices ES1, ES2 and ES3 adapted to be actuated by the elevator 27 of the broach handling mechanism. The switch devices may be simple devices, that is, composed of but a single switch, or compound devices, that is, composed of a plurality of switches. Preferably the switches of the switch devices are suitably enclosed to protect the same. The switch device ES2 is a maintained contact switch device, that is, the device remains in the position to which it has been actuated. Switch devices RS1, RS2 and ES1 and ES3 on the other hand are not maintained switch devices, but have a normal position which is the free position and an actuated position which is that assumed when the switch device is engaged by suitable means such as cams or dogs on the ram or the elevator.

As best seen in Fig. 6, the switch device RS1 is a compound device having switches RS1', RS1². The switch device RS1, as seen in Fig. 2, is mounted on the frame 11 near the top thereof to be actuated by a cam dog D1 carried by the ram 16 when the latter is in its initial or withdrawn position. In this actuated position of the switch device RS1, the switches RS1' and RS1² are respectively open and closed. When the ram moves downwardly on the broaching stroke and the switch device RS1 is released to assume its normal position, the switches RS1' and RS1² will assume their normal position which is respectively closed and open. The switch device RS2 is a simple device having but a single switch RS2' which is closed in the normal position of the switch device and which is open when the switch device is actuated. The switch device RS2 (see Fig. 2) is mounted on the frame 11 below the switch device RS1 and is adapted to be actuated by a dog D2 (see Fig. 5) when the ram reaches the end of its broaching stroke. In addition to the dogs D1 and D2, the ram 16 carries a dog D3 which is positioned to engage and actuate the safety valves 66 and 67 should the ram overrun its normal limits of movement.

Switch devices ES1 and ES3 are both simple devices having but a single switch ES1' and ES3', respectively. The switch ES1' is normally closed and thus is open when actuated, while the switch ES3' is normally open and thus is closed when the switch device ES3 is actuated. The switch devices ES1 and ES3 are mounted on the frame 11 of the machine near the top thereof and opposite the switch RS1, as best seen in Fig. 2, in a position to be actuated respectively by a dog D4 and a dog D5 carried by the elevator 27. The dog D4 actuates the switch ES1 when the elevator is in its uppermost or initial position, while the dog D5 actuates the switch device ES3 at the time the elevator 27 has moved downwardly sufficiently to load the broach through the work and engage the same in the means 23 of the ram 16. The switch device ES2 is mounted on the frame 11 intermediate the switch devices ES1 and ES3, but closer to the switch device ES3, and is adapted to be actuated by a dog D6 (see Fig. 5) simultaneously with or preferably just slightly subsequent to the actuation of the switch device ES3. As previously mentioned, the switch devices ES2 is a maintained contact switch device and in the present instance has a single switch ES2' which remains in either an open or a closed position depending upon to which position it has last been actuated. In the present instance the switch is actuated to a closed position in the upward or return movement of the elevator 27 and is actuated to an open position as an incident to a downward or loading movement of the elevator 27.

In addition to the automatically actuated switches described, the electrical control system includes five manually actuated switches MS1, MS2, MS3, MS4 and MS5. Of these, switch MS1 is a starting switch which is biased to open position and is momentarily closed to condition the low voltage circuit. The switch MS2 is a normally closed switch and serves as an emergency stop switch for arresting the machine, while switch MS3 is a special starting switch normally biased to open position and intended to be closed for starting the ram on its broaching stroke after the ram has been stopped as an incident to an opening of the emergency stop switch MS2. These three switches just described are all mounted at the left front of the machine, as viewed in Fig. 2, where they are readily accessible to an operator standing before the machine. The switches MS4 and MS5 are primary switches for initiating the broaching half and the return half, respectively, of the cycle of operation of the broaching machine. These switches are associated with a lever 95 (see Figs. 2 and 5) which lever actuates the work supporting fixture 13. When swung to the position shown in Fig. 5, the lever 95 first locks the work supporting fixture 13 and then actuates the switch MS4 to close the same for initiating the broaching half of the cycle by initiating downward movement of the elevator 27. When the lever 95 is swung to the opposite position from that shown in Fig. 5, it first withdraws the work supporting fixture and unlocks the same so that the work may be removed and then actuates the switch MS5 to close the same for initiating the return half of the cycle of the broaching machine by initiating return movement of the ram 16.

Having described the relays, the switch devices and the switches actuated thereby, the connection thereof in the electrical control system will now be described. As previously stated, the system comprises a high voltage circuit which includes the solenoids A and B for shifting the four-way valve 60 in the high pressure ram circuit. Herein the solenoids A and B are connected in parallel between the main line wires L1 and L2 and connected in series respectively with the solenoids A and B are the relay control switches C—A' and C—A² and C—B' and C—B². The switches are connected on opposite sides of the solenoids A and B respectively, in order that the solenoids may be completely disconnected when the relays RA and RB are deenergized so as to avoid any possible energization of the solenoids by a short circuit. Also connected between the line wires L1 and L2 in parallel with the solenoids A and B is a primary winding P of a transformer T. Connected in the line wire L2 ahead of the solenoids and the winding P is a manually actuated switch 96 serving as a master switch controlling the entire electrical system.

The low voltage circuit which includes the solenoids for the valve 82, as well as all of the relays and the manually and automatically actuated switches, derives its energy from the high voltage circuit and to that end a secondary winding S of the transformer T is connected at its ends to wires L3 and L4. Connected across the wires L3 and L4 is the starting relay RS and connected in series therewith is the normally open starting switch MS1 and the normally closed emergency stop switch MS2. It will thus be seen that energization or deenergization of the relay RS is controlled by the switches MS1 and MS2. As previously stated, the relay RS controls the switches C—S' and C—S². The former of these switches, namely C—S' is connected around the normally open starting switch MS1 so as to form a holding circuit for the relay RS once the switch MS1 has been momentarily closed. The switch C—S² is disposed in the wire L3 to control the flow of current to all of the remaining switches, solenoids and relays in the remainder of the low voltage circuit.

The solenoid M is connected between the wires L3 and L4 and has in series therewith on opposite sides the switches C—M' and C—M². These switches, as previously stated, are controlled by the relay RM which is connected between the wires L3 and L4 and has connected in series therewith the manual switch MS4 and also the maintained contact switch ES2' which is controlled by the elevator 27. Connected in parallel with the relay RM is the relay RA having the manual switch MS4 common to the two relays. To that end the relay RA is connected at one end to the wire L4 and at the other end is connected by a lead 100 to the circuit of the relay RM intermediate the switches MS4 and ES2'. Interposed in the lead 100 is the switch RS2' and also interposed in the lead 100 in series with the switch RS2' is a parallel circuit 101 having the switch ES3' in one branch and the switch C—A³ in the other branch. In order that the relay RA may be energized independently of the switch MS4 and of the switches in the parallel circuit 101 a lead 102 is connected at one end to the wire L3 and to the lead 100 intermediate the parallel circuit 101 and the switch RS2'. In the lead 102 is the switch MS3 which it will be remembered is in the nature of an emergency switch for continuing the downward or broaching stroke of the ram after it has been interrupted by an opening of the emergency stop switch MS2.

Like the solenoid M, the solenoid N is connected across the wires L3 and L4 and connected in series therewith on opposite sides thereof are the switches C—N' and C—N². The switches C—N' and C—N² it will be remembered are controlled by the relay RN. This relay is connected across the wires L3 and L4 and has in series therewith the manual switch MS5 and the automatic switches RS1² and ES1'. Connected in parallel with the relay RN is the relay RB. This relay has in series therewith the switch RS1' and the relay is connected at one end to the wire L4, while one terminal of the switch RS1' is connected to the circuit of the relay RN intermediate the switch MS5 and the switch RS1², in order that the switch MS5 may be common to the relays RB and RN.

The operation and the function of the various switches, relays and solenoids as well as the valves controlled by the solenoids is most readily and best understood from the operation of the broaching machine. The operation of the machine will therefore be described briefly in order better to correlate the functional relationship of the various elements of the power and the control systems. For that purpose, let it be assumed that the ram or slide 16 and the elevator 27 are in their initial or withdrawn position as indicated in the drawings and that the switches and switch devices are in the positions indicated in the drawings, which positions correspond to the positions of the ram and the elevator, and to the dotted line position of the lever 95 in Fig. 5.

Under such conditions, to start a cycle of operation the attendant of the machine would first start the electric motor 57 with the result that fluid under pressure would be supplied by the pump RP to the supply pipe 59 of the high pressure or ram circuit and fluid under pressure would be supplied by the pump LP to the supply line 81 of the low pressure or broach handling mechanism circuit. No movement of either the ram 16 or the elevator 27 would take place, however, because the valves 60 and 82 are in neutral position causing the fluid to be by-passed and returned directly to the reservoir 56 through the return conduits 63 and 85, respectively. Next the operator would close the switch 96 and would momentarily depress the manual switch MS1. Such closure of the manual switch MS1 would energize the relay RS with resultant closure of the switch C—S' which would then complete a holding circuit for the starting relay RS permitting the manual switch MS1 to be released. The switch C—S² also would be closed thereby conditioning a circuit for the remaining relays and the solenoids M and N.

The machine is now conditioned for production and the attendant would next place a work piece to be broached in the work supporting fixture 13 and would then swing the lever 95 clockwise from the broken to the solid line position shown in Fig. 5. Such movement of the lever 95 would first lock the work and the fixture in broaching position and in the final movement would close the switch MS4. Closure of MS4 would energize the relay RM since, as can be seen in Fig. 6, the maintained contact switch ES2' is now closed. As a result of the energization of the relay RM, the switches C—M' and C—M² controlled thereby would be closed, completing the circuit for the solenoid M and thereby causing the same to shift the core of the valve 82.

With the core of the valve 82 shifted, as an incident to the energization of the solenoid M, pressure fluid is now supplied through the conduit 81, the valve 82 and conduit 83 to the rod end of the cylinder 45 to initiate downward movement of the elevator 27. During this initial downward movement, the ram 16 remains stationary and thus the movement of the elevator is relative to the ram and consequently the broaches 29 are loaded through the work piece and the work supporting table into the broach engaging means 23 carried by the ram 16. Substantially simultaneously with the reception of the ends of the broaches 29 in the engaging means 23, dogs D5 and D6 engage and actuate respectively the switch device ES3 and the switch device ES2, with the result that the corresponding switches ES3' and ES2' are reversed from the position shown in Fig. 6, namely, the switch ES2' is opened while the switch ES3' is closed. As a result the relay RM is deenergized causing the switches C—M' and C—M² controlled thereby to be opened and the solenoid M deenergized. Closure of the switch ES3', however, completes the circuit to the relay RA with the result that the switches C—A' and C—A² are closed and the solenoid A energized. The core of the valve 60 is shifted by such energization of the solenoid A so that pressure fluid from the supply line 59 is now discharged through the conduit 61 to the head end of the ram cylinder 36. Downward movement of the ram in a broaching stroke results and the broach is drawn through the work piece.

During the major portion of such broaching stroke of the ram 16, the elevator 27 moves with the ram and thus through the major portion of the stroke continues to guide and support the upper ends of the broaches 29 to assume proper alinement of the broaches and thus a proper broaching operation. It is to be remembered that with the solenoid M deenergized the valve 82 is returned to neutral position, thus permitting a free interchange of fluid between the ends of the cylinder 45 during the movement of the elevator 27 with the ram 16. Toward the end of the broaching stroke, the elevator strikes an abutment B fixed on the frame and is thus restrained against further movement with the ram 16. The ram, however, continues its broaching or downward stroke and, as a result, the broaches are withdrawn from the sockets 28 in which they are yieldably retained and are also drawn completely through the work piece. After the broaches are drawn completely through the work piece the dog D2 carried by the ram actuates the switch device RS2 and accordingly opens the switch RS2'. It will be apparent from a reference to Fig. 6 that such opening of the switch RS2' deenergizes the relay RA and, as an incident thereto, deenergizes the solenoid A, permitting the core of the valve 60 to return to its neutral position. Thus at this point the ram and the elevator are at rest with no fluid under pressure being supplied to either the cylinder 36 or the cylinder 45.

To initiate the second or return half of the cycle of operation of the broaching machine, the attendant swings the lever 95 from its engagement with the switch MS4 counterclockwise as viewed in Fig. 5 toward engagement with the switch MS5. The initial portion of such swinging movement of the lever 95 withdraws the work supporting fixture 13 and releases the work so that the same may be unloaded from the table and in the final movement closes the switch MS5 which was opened as an incident to the swinging of the lever 95 to initiate the broaching half of the cycle. Since the switch RS1' was closed as an incident to disengagement of the dog D1 with the switch device RS1, closure of the manual switch MS5 now completes a circuit for the relay RB which is energized and closes the switches C—B' and C—B² to energize the solenoid B. Energization of the solenoid B shifts the core of the valve 60 to a position in which fluid under pressure from the supply line 59 is discharged through the conduit 26 to the rod end of the cylinder 36 to initiate a return stroke of the ram 16. During this initial return movement of the ram 16, the elevator 27 remains stationary relative to the frame, the friction of the ways 26 not being sufficient to overcome gravity and other forces opposing movement, and thus the movement of the ram is relative to the elevator, with the result that the broaches 29 are passed upwardly through the work supporting table and are forced into the sockets 28 of the elevator. From that point in the return movement of the ram 16 until it reaches its initial or fully retracted position, the elevator and the ram move as a unit.

Upon reaching its initial position, the ram 16 through the dog D1 actuates the switch device RS1 again to open the switch RS1' and thereby deenergize the relay RB with the result that the solenoid B is deenergized permitting the core of the valve 60 to return to neutral position in which the supply of fluid to the rod end of the cylinder 36 is terminated. The switch ES1' having been closed as an incident to the initial downward movement of the elevator 27, closure of the switch RS1² as an incident to the actuation of the switch device RS1 upon return of the ram to initial position completes the circuit for the relay RN, which thus closes switches C—N' and C—N² to energize the solenoid N. With the energization of the solenoid N, the core of the valve 82 is shifted so that fluid under pressure is supplied through the conduit 84 to the head end of the cylinder 45. The elevator 27 thus is raised relative to the ram 16 and carries the broaches 29 with it since the devices 23 released the broaches as an incident to the return of the ram to initial position. The elevator 27 continues to rise until the dog D4 carried thereby strikes the switch device ES1, thereby opening the switch ES1' and breaking the circuit to the relay RN. With the relay RN deenergized the solenoid N is deenergized and the valve 82 returned to neutral position so that no fluid under pressure is supplied to the cylinder 45 and the entire machine is now again at rest. In this position of the elevator 27, the broaches are raised a sufficient distance above the work supporting table so that new work pieces may be loaded thereon. In the initial movement of the elevator relative to the ram, the dog D6 again actuates the switch device ES2 to return the switch ES2' to its initial or closed position to condition the circuit for the relay RM for the next broaching cycle. This does not energize relay RM because switch MS4 is open.

Should it become necessary during the course of the operation, particularly during the broaching portion of the cycle to arrest the operation of the machine, this is readily done by depressing the emergency stop switch MS2 which would cause all the relays to be deenergized and thus cause all of the solenoids to be denergized, permitting the valves to return to neutral position. The machine may be again placed in operation to continue the broaching stroke by momentarily depressing the start switch MS1 and the emergency start switch MS3.

Should the ram 16 for any reason travel beyond the normal limits, that is, those determined by the actuation of the switch devices RS1 and RS2, the safety valves 66 and 67 would be actuated and would thus cause the relief valve 64 to discharge at no pressure to the reservoir 56, thus taking strain off of the packing of the ram. To restore the circuit and the ram to operation, the hand valve 69 is momentarily closed so as to withdraw the valve 64 from the control of the valves 66 or 67, the valve 69 to be opened again immediately after the ram has been returned within its normal limits of movement.

I claim as my invention:

1. In an internal pull broaching machine, a frame, a work supporting fixture mounted on said frame, a main power driven slide mounted on said frame for reciprocation relative to said work supporting fixture, said slide having broach engaging means near one end for one end of the broach and near the other end having a reduced portion providing longitudinally extending ways, and mechanism for handling the broach by its other end including an elevator slidably mounted in the ways of the reduced portion of the main slide.

2. In a broaching machine, a main broach actuating slide having at one end a lateral extension carrying broach engaging means and at the other end carrying parallel ways extending longitudinally of the slide, and an elevator slidably mounted in the ways of said slide, power means for actuating said elevator, and control means for said power means causing said elevator to move with said slide and also relative thereto.

3. In a broaching machine, a broach actuating slide, broach engaging means at one end of said slide operable automatically to receive and engage a broach pressed thereinto and actuable to release the broach, an elevator slidable directly on said slide at the end opposite said broach engaging means in a direction parallel with the direction of movement of the slide, and means carried by the elevator for yieldably retaining a broach.

4. An internal pull broaching machine comprising, in combination, an upstanding frame, a work supporting fixture mounted on the front of said frame intermediate the ends thereof, vertical guideways formed in the front of said frame, a slide mounted in said guideways on the frame for vertical reciprocatory movement relative to said work supporting fixture, a lateral projection carried by the slide at its lower end, means carried by said projection for chucking one end of a broach, the upper end of said slide being formed with guideways extending longitudinally thereof, and mechanism for chucking the broach by its other end comprising an elevator slidably mounted in the guideways on said slide.

5. A broaching machine comprising, in combination, a work supporting fixture, a power driven main slide for actuating a broach through a broaching and a return stroke, automatic broach handling mechanism including an elevator for supporting a broach prior to a broaching stroke and subsequent to a return stroke imparted to the broach by said main slide, power means for actuating said main slide and said elevator, and control means for said power means including manually actuable means for initiating the broaching half and the return half of the cycle of operation of the broaching machine, and automatically actuated means for coordinating the movements of the main slide and the elevator and for bringing the same to rest at the end of the broaching half and the end of the return half of the cycle of operation of the machine.

6. An internal broaching machine having, in combination, a frame, a work supporting fixture mounted thereon, a main slide for carrying and actuating a broach reciprocably mounted on said frame, means secured to said slide and disposed on one side of the work supporting fixture for chucking one end of a broach, power means for reciprocating said main slide, automatic broach handling mechanism including a carrier slidably mounted on said main slide, means on said carrier for supporting a broach from its other end and power means for reciprocating said carrier, and control means for said power means including a manually controlled member actuable in one direction to lock a work piece and the work supporting fixture in broaching position and for initiating movement of said carrier in a direction to insert a broach carried thereby through the work piece and into the broach receiving and retaining means of said main slide and actuable in the opposite direction to unlock said work supporting fixture and initiate a return stroke of said main slide.

7. A broach machine having, in combination, a work supporting fixture, a main slide for actuating a broach through a broaching and a return stroke, means mounted on said slide near one end thereof for chucking one end of a broach, power means for reciprocating said slide, automatic broach handling mechanism including a carrier for supporting the broach from its other end, said carrier being slidably mounted directly on said main slide, and power means for reciprocating said carrier, and control means for said power means including manually actuable means for initiating the cycle of operation of the broaching machine and automatically actuated means for coordinating the movements of said main slide and said carrier to obtain a cycle of operation in which the carrier inserts a broach carried thereby through the work and into engagement with the broach chucking means on the main slide, guides the trailing end of the broach throughout the major portion of the broaching operation and at the end of the cycle withdraws the broach to a position spaced from the work supporting fixture to enable the loading of a new work piece.

8. An internal pull broaching machine having, in combination, a work supporting fixture, a main slide for actuating the broach mounted for reciprocation relative to said work supporting fixture, means mounted on said slide near one end thereof for chucking one end of a broach, power means for reciprocating said main slide, automatic broach handling mechanism for the other end of the broach including a carrier mounted directly on said slide for movement both relatively to and jointly with said slide and power means for reciprocating said carrier on said slide, and control means for said power means including a first manually actuable device for initiating movement of said carrier relative to said main slide for inserting a broach carried by the carrier through a work piece and into engagement with the broach chucking means on the main slide, a first carrier actuated control device operable upon actuation to initiate a broaching stroke of said main slide and a second carrier actuated control device operable to arrest return movement of the carrier.

9. An internal broaching machine having, in combination, a work supporting fixture, a ram for actuating a broach through a broaching and a return stroke, means carried on said ram for chucking one end of a broach, an hydraulic motor for reciprocating said ram, automatic broach handling mechanism including a carrier slidably mounted directly on said ram for movement both with and relative to said ram, means on said carrier for releasably chucking the broach by its other end and an hydraulic motor for reciprocating said carrier on said ram, an hydraulic circuit including a source of fluid under pressure and a plurality of control valves supplying operating fluid to said hydraulic motors to impart movements to said carrier and ram in a predetermined sequence and an electrical control system for coordinating the operation of said valves to obtain a cycle of operation of the broaching machine in which the carrier moves both with and relative to said ram.

10. An internal broaching machine having, in combination, an upstanding frame, a work supporting fixture mounted on said frame, a ram for actuating a broach through a pull broaching and a return stroke slidably mounted on said frame for reciprocation relative to said fixture, means carried by the lower end of said ram for chucking one end of the broach, an hydraulic motor for reciprocating said ram, automatic broach handling mechanism for the other end of the broach including an elevator slidably mounted on the upper end of said ram for movement both with and relative thereto, means on said elevator for releasably chucking said other end of the broach and an hydraulic motor for reciprocating said elevator, an hydraulic system including a source of fluid under pressure and a plurality of control valves for supplying operating fluid to said hydraulic motors, certain of said valves being electrically actuable, and an electrical control system for governing said electrically actuated valves to obtain the desired cycle of operation of the machine including a manually actuable switch device for initiating downward movement of said elevator relative to said ram, the switch device actuated by said elevator to initiate a broaching stroke of the ram whereby the ram and elevator move jointly, means positively arresting said elevator at the end of its stroke while the ram continues on its broaching stroke, and a switch actuated by said ram for arresting broaching movement of the ram.

11. In an internal pull broaching machine, a frame having parallel guideways, a work supporting fixture mounted on said frame, a main elongated power driven slide mounted in the guideways on said frame for reciprocation relative to said work supporting fixture, said slide having broach engaging means near one end for one end of a broach and near the other end having longitudinally extending ways formed therein, and mechanism for handling and guiding the broach by its other end including an auxiliary carrier slidably mounted in the ways on said main slide and guided throughout its length and throughout its movement by the ways.

12. In an internal pull broaching machine, a frame having parallel guideways, a work supporting fixture mounted on said frame, an elongated power driven slide mounted in the guideways on said frame for reciprocation relative to said work supporting fixture, said slide having a main portion with a cylinder formed integrally therewith and an integral extension at one end having longitudinally extending ways formed therein, broach engaging means on said slide near the end opposite said extension for engaging one end of a broach, and mechanism for handling and guiding the broach by its other end including an auxiliary slide mounted for reciprocation in the ways on said main slide and guided throughout its length and throughout its movement by the ways.

13. An internal pull broaching machine having, in combination, a work supporting fixture, a main slide for actuating the broach mounted for reciprocation relative to said work supporting fixture, means mounted on said slide near one end thereof for chucking one end of a broach, power means for reciprocating said main slide, automatic broach handling mechanism for the other end of the broach including a carrier mounted directly on said slide for movement both relatively to and jointly with said slide and power means for reciprocating said carrier on said slide, and control means for said power means including a first manually actuable device for initiating a return stroke of said ram while said carrier remains stationary for returning a broach carried by the ram to engagement with chucking means on said carrier, a ram actuated control device operable upon actuation to terminate the return stroke of said ram and initiate movement of said carrier relative to said ram, and a carrier actuated control device operable to arrest return movement of the carrier.

14. An internal broaching machine having, in combination, an upstanding frame, a work supporting fixture mounted on said frame, a ram for actuating a broach through a pull broaching and a return stroke slidably mounted on said frame for reciprocation relative to said fixture, means carried by the lower end of said ram for chucking one end of the broach, an hydraulic motor for reciprocating said ram, automatic broach handling mechanism for the other end of the broach including an elevator slidably mounted on the upper end of said ram for movement both with and relative thereto, means on said elevator for releasably chucking said other end of the broach and an hydraulic motor for reciprocating said elevator, an hydraulic system including a source of fluid under pressure and a plurality of control valves for supplying operating fluid to said hydraulic motors, certain of said valves being electrically actuable, and an electrical control system for governing said electrically actuated valves to obtain the desired cycle of operation of the machine including a manually actuable switch means for initiating a return stroke of said ram, switch means actuated as an incident to return of said ram to normal position to arrest return movement thereof and initiate upward movement of said elevator relative to said ram, and switch means actuated by said elevator for arresting the upward movement thereof.

15. An internal broaching machine having, in combination, an upstanding frame, a work supporting fixture mounted on said frame, a ram for actuating a broach through a pull broaching and a return stroke slidably mounted on said frame for reciprocation relative to said fixture, means carried by the lower end of said ram for chucking one end of the broach, an hydraulic motor for reciprocating said ram, automatic broach handling mechanism for the other end of the broach including an elevator slidably mounted on the upper end of said ram for movement both with and relative thereto, means on said elevator for releasably chucking the other end of the broach and an hydraulic motor for reciprocating said elevator, an hydraulic system including a source of fluid under pressure and a plurality of control valves for supplying operating fluid to said hydraulic motors, certain of said valves being electrically actuable, and an electrical control system for governing said electrically actuated valves including manually actuable means for initiating a half cycle of operation of the broaching machine and automatically actuated means for coordinating the movements of the main slide and the elevator and for bringing the same to rest at the end of the half cycle of operation of the machine.

16. An internal pull broaching machine having, in combination, a work supporting fixture, a main slide for actuating the broach mounted for reciprocation relative to said work supporting fixture, means mounted on said slide near one end thereof for chucking one end of a broach, power means for reciprocating said main slide, automatic broach handling mechanism for the other end of the broach including a carrier mounted directly on said slide for movement both relatively to and jointly with said slide and power means for reciprocating said carrier on said slide, and control means for said power means including a carrier actuated control device operable upon actuation to initiate a broaching stroke of said main slide, and a manually actuated control device operable upon actuation to initiate the return stroke of said main slide.

17. An internal pull broaching machine having, in combination, a work supporting fixture, a main slide for actuating the broach mounted for reciprocation relative to said work supporting fixture, means mounted on said slide near one end thereof for chucking one end of a broach, power means for reciprocating said main slide, automatic broach handling mechanism for the other end of the broach including a carrier mounted directly on said slide for movement both relatively to and jointly with said slide and power means for reciprocating said carrier on said slide, and control means for said power means including a first manually actuable device for initiating movement of said carrier relative to said main slide for inserting a broach carried by the carrier through a work piece and into engagement with the broach chucking means on the main slide, a carrier actuated control device operable upon actuation to initiate a broaching stroke of said main slide, and a second manually actuated control device operable upon actuation to initiate the return stroke of said main slide.

FRANCIS J. LAPOINTE.